UNITED STATES PATENT OFFICE.

HERMAN L. HARTENSTEIN, OF CHICAGO, ILLINOIS, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

MANUFACTURE OF CARBID.

No. 819,219.     Specification of Letters Patent.     Patented May 1, 1906.

Application filed July 23, 1902. Renewed September 30, 1905. Serial No. 280,724.

*To all whom it may concern:*

Be it known that I, HERMAN L. HARTENSTEIN, a citizen of the United States, residing at Chicago, in the county of Cook and State of Illinois, have invented a new and useful Manufacture of Carbid, of which the following is a specification.

This invention relates to the manufacture of carbid.

In the manufacture of carbid as heretofore carried out it is the usual custom to reduce a mixture of lime and carbon containing elements to melted condition. By reason of the refractory character of the lime-containing element it has usually been found advisable to use a smaller percentage of carbon in order to promote the reduction of the material to liquid or fluid condition, enabling the mass to flow or to be tapped from the furnace rapidly, an electric or other furnace being employed for reducing the material to fluid or liquid condition. During the melting and converting operation in the furnace considerable quantities of metallic calcium are produced and which metallic element is produced in larger quantity in proportion as the quantity of carbon element used is reduced, and when the finished product is cooled down the calcium remains disseminated or mixed throughout the lump or ingot of carbid, and under the action of water in the subsequent operation of generating gas from the carbid free hydrogen is produced from such metallic calcium, and which hydrogen of course detracts from the illuminating quality of the gas produced and the presence of which is otherwise seriously objectionable.

It is among the special objects of my present invention to avoid the objections noted and to produce a finished product which is entirely and perfectly converted throughout its entire mass and wherein the generation of hydrogen in the subsequent operation of generating gas is avoided, thereby greatly improving the illuminating quality of the gas produced.

In carrying out my invention I supply to the carbid or mass while still in a molten condition carbon to replace the percentage of that element which had been previously withheld from the materials prior to the fusing or converting operation to promote the fusion or melting operation, and which carbon or carbonaceous material so supplied to the molten mass serves to effect a complete conversion of any disseminated unconverted or metallic elements, constituents, or particles of the mass.

In practice the carbon element is supplied to the molten mass preferably in free, fine, or bolted condition. I have found that any desired form of carbonaceous material—such, for instance, as coke, charcoal, or lampblack—may serve the desired purpose. This carbonaceous material may be added or supplied to the molten mass in any suitable or convenient manner. I have found in practice that a convenient arrangement is to sprinkle or otherwise supply the finely-divided carbonaceous material into a heated mold, reservoir, or other receptacle, into which the molten mass is delivered from the electric or other furnace or otherwise. The carbon is quickly and rapidly absorbed by the molten mass, a portion of the carbon combining with a portion of the oxygen of the metallic or unconverted particles or elements of the molten mass, thereby liberating gas which bubbles up through the molten mass, causing the same to "boil," this ebullition resulting in effecting a thorough intermingling or admixture of the remaining freshly-supplied particles of fine carbon throughout the entire molten mass, and hence effecting a thorough and complete conversion of any unconverted particle or portion of the mass, the finished product or carbid being pure and free from unconverted or metallic calcium or other elements, and hence avoiding the generation of hydrogen in the subsequent operation of generating gas by the addition of water to the carbid. In this manner I produce a pure article the illuminating power of which is greatly enhanced by reason of the absence of hydrogen and every particle of which is utilized in the production of gas.

Having now set forth the object and nature of my invention and a method of carrying the same into practical operation, what I claim as new and useful and of my own invention, and desire to secure by Letters Patent, is—

1. In the manufacture of carbid, the method which consists in first fusing lime-and-carbon containing elements to reduce the same to liquid or fluid condition, and finally supplying carbonaceous material to the mass while in a molten condition, to complete the conversion of metallic elements or particles of the mass.

2. In the manufacture of carbid, the method which consists in first fusing lime-containing material with only a small percentage of carbon, to reduce the same to liquid or fluid state, and then applying carbonaceous material to the molten mass while in fluid or liquid condition to complete the conversion.

3. In the manufacture of carbid, the method which consists in first fusing lime-containing material in the presence of only a small amount of carbon, to reduce the same to liquid or fluid state, then heating a mold or other receptacle, and applying thereto carbon in a finely-divided state, and finally delivering the molten mass while still in a liquid or fluid condition into such mold, whereby the finely-divided carbon completes the conversion of any unconverted metallic particles of the mass.

In witness whereof I have hereunto set my hand, this 14th day of July, 1902, in the presence of the subscribing witnesses.

HERMAN L. HARTENSTEIN.

Witnesses:
FRANK T. BROWN,
S. E. DARBY.